United States Patent [19]

Vaughan

[11] Patent Number: 4,717,560
[45] Date of Patent: Jan. 5, 1988

[54] CRYSTALLINE ZEOLITE COMPOSITION (ECR-5) HAVING A CANCRINITE-LIKE STRUCTURE AND PROCESS FOR ITS PREPARATION

[75] Inventor: David E. W. Vaughan, Flemington, N.J.

[73] Assignee: Exxon Research and Engineering Company, Florham Park, N.J.

[21] Appl. No.: 698,014

[22] Filed: Feb. 4, 1985

[51] Int. Cl.[4] .............................................. C01B 33/28
[52] U.S. Cl. ................................... 423/328; 423/118; 423/329; 423/330; 502/60
[58] Field of Search ................ 423/326, 327, 328, 329, 423/330, 118

[56] References Cited

U.S. PATENT DOCUMENTS

| | | | |
|---|---|---|---|
| 2,574,902 | 11/1951 | Bechtold et al. | 252/3.3 |
| 3,433,736 | 3/1969 | Guth et al. | 423/328 |
| 3,459,501 | 8/1969 | Plank et al. | 423/328 |
| 3,674,709 | 7/1972 | Barrer et al. | 502/74 |
| 4,093,699 | 6/1978 | Sand | 423/328 |
| 4,175,114 | 11/1979 | Plank et al. | 423/329 |
| 4,178,352 | 12/1979 | Vaughan et al. | 423/329 |
| 4,238,361 | 12/1980 | Alafandi et al. | 423/328 |
| 4,264,474 | 4/1981 | Alafandi et al. | 423/328 |
| 4,341,748 | 7/1982 | Plank et al. | 423/328 |
| 4,452,907 | 1/1984 | Ball et al. | 423/328 |
| 4,530,824 | 7/1985 | Arika et al. | 423/329 |
| 4,533,649 | 8/1983 | Ball et al. | 423/328 |

FOREIGN PATENT DOCUMENTS 207185  2/1984  German Democratic Rep. ................................... 423/328

OTHER PUBLICATIONS

Hans Villiger, "Structural Aspects of Some Porous Crystals and Their Inclusion Complexes", PhD Thesis University of London, Jan. 1969.

R. M. Barrer and David E. W. Vaughan, "Trapping of Inert Gases in Sodalite and Cancrinite Crystrals", J. Phys. Solids., Pergammon Press, 1971, vol. 32, pp. 731-743.

Klinowski et al., *J. Chem. Soc. Faraday I*, 78, (1982), p. 1025 et seq.

Magee & Blazek, *ACS Monograph* 171, Ch. 11, Ed. J. A. Rabo.

Barrer, Hydrothermal Chemistry of Zeolites, Academic Press, (1982), Ch. 7.

Melchior et al., *Am. Chem. Soc.* 104, (1982), p. 4859 et seq.

Jarchow, *Zeit. Krist.*, 122, 407, (1965).

Pahor et al., *Acta Cryst.*, B38, 407, (1982).

Barrer & Vaughan, *J. Phys. Chem. Solids*, 32, 731, (1971).

Barrer, *J. Chem. Soc. A*, 1523, (1970).

Primary Examiner—John Doll
Assistant Examiner—Jackson Leeds
Attorney, Agent, or Firm—E. Thomas Wheelock; Henry E. Naylor

[57] ABSTRACT

A crystalline zeolite may be prepared which has a composition, in terms of mole ratios of oxides, in the range:

1.0 to 1.3 $Na_2O:Al_2O_3:2.1$ to 8.0 $SiO_2$ and having a cancrinite-like structure in which the twelveing channel thereof is not blocked by, for example, salt molecules. The preferred compositions are of the formula:

1.1 to 1.3 $Na_2O:Al_2O_3:2.4$ to 3.1 $SiO_2$

This zeolite may be prepared from crystallization of an aged reaction mixture containing aqueous ammonia, a source of silica, a source of alumina and sodium hydroxide.

13 Claims, 1 Drawing Figure

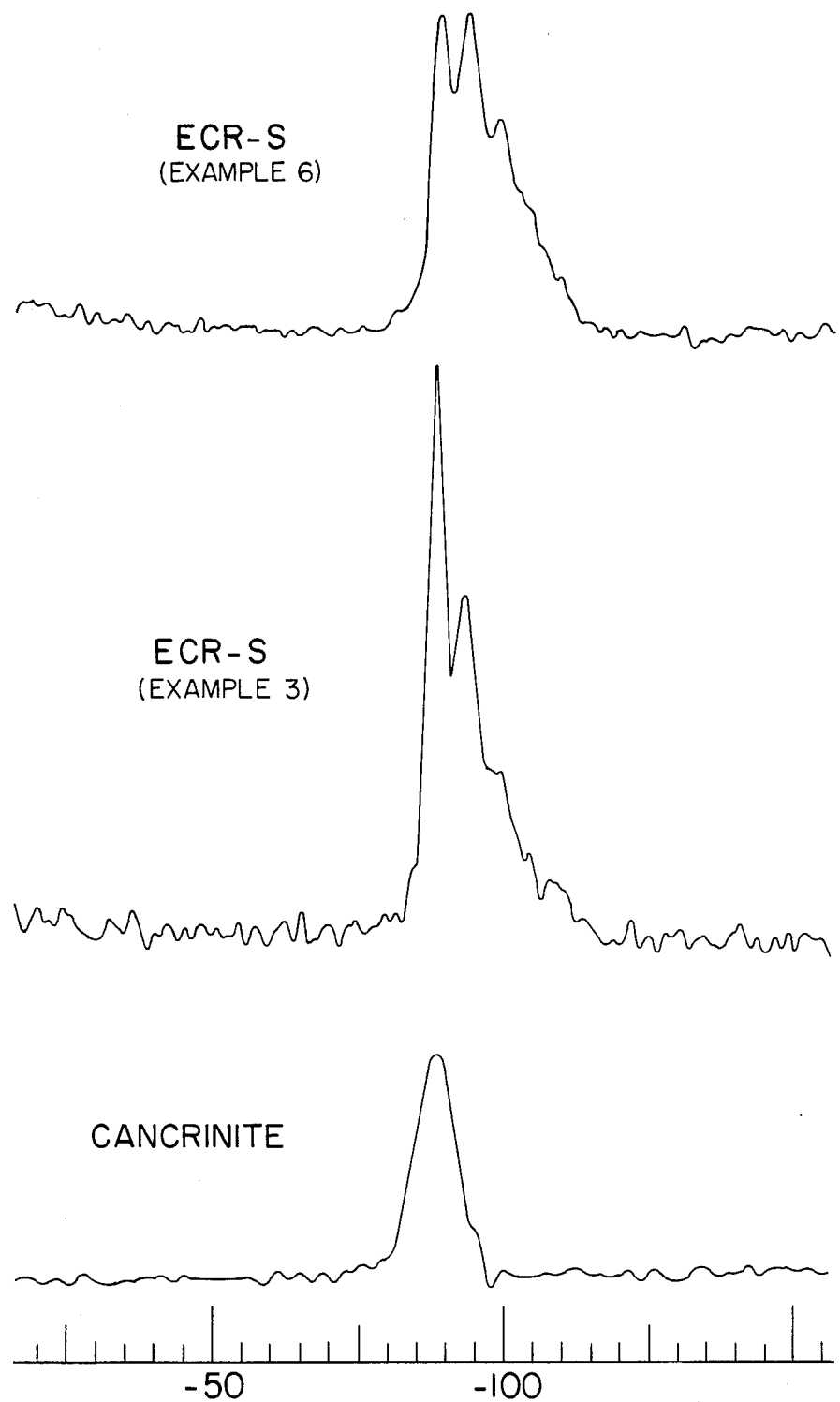

CRYSTALLINE ZEOLITE COMPOSITION (ECR-5) HAVING A CANCRINITE-LIKE STRUCTURE AND PROCESS FOR ITS PREPARATION

FIELD OF THE INVENTION

This invention relates to a novel zeolite and to a process for its preparation. In particular, the zeolite, known for convenience as ECR-5, apparently has a cancrinite-like structure and is prepared using a synthesis solution containing aqueous ammonia.

BACKGROUND OF THE INVENTION

Cancrinite is a well-known natural zeolite having a $SiO_2:Al_2O_3$ ratio of two which is readily synthesized in systems consisting of $Na_2O-SiO_2-Al_2O_3-H_2O$ in the presence of a large variety of salts. See, for example, Barrer et al., *J. Chem. Soc. A*, 1523 (1970). In addition, U.S. Pat. No. 3,433,736 discloses hydroxyparacancrinite of the formula $3(Al_2O_3, 2SiO_2, Na_2O)2NaOH$ from a mixture of silica, aluminum hydroxide and water. The main characterizing feature of cancrinite is a single 12-ring channel parallel to the 'c' axis as described by Jarchow, *Zeit Krist.*, 122, 407 (1965) and Pahor et al., *Acta Cryst.*, B38, 893 (1982)). Because this channel is invariably faulted or blocked by salt molecules, the structure tends to have very poor sorption properties, even when attempts are made to remove the excess salt molecules. See Barrer and Vaughan, *J. Phys. Chem. Solids*, 32, 731 (1971). The synthesis chemistry has been reviewed at great length by Barrer, *Hydrothermal Chemistry of Zeolites*, Academic Press (1982), Ch. 7.

If the channel of the cancrinite could be unblocked, the cancrinite would be expected to be a highly active catalyst (as are other zeolites having 12-ring channel systems) such as mordenite and offretite for cracking, hydrocracking and hydrodewaxing, and mordenite and zeolite L for hydroisomerization.

U.S. Pat. No. 3,459,501 teaches preparation of a zeolite by treating a silica-alumina gel with aqueous ammonia and then reacting the treated gel with sodium hydroxide and aluminum sulfate. The zeolite prepared is a high-silica faujasite, not a cancrinite.

Although the synthetic analog of the zeolite cancrinite is easy to produce and is otherwise well-characterized, it always has an Si/Al ratio at unity, whether in its natural state or synthesized in a wide variety of systems.

SUMMARY OF THE INVENTION

According to the present invention, a novel zeolite with a cancrinite-like structure is synthesized over a range of $SiO:Al_2O_3$ ratios in forms where the twelvering channel is substantially unblocked and unfaulted, such that the zeolite obtained is a superior sorbent. More particularly, the present invention relates to a crystalline zeolite, ECR 5, having a composiion, in terms of mole ratios of oxides, in the range:

1.0 to 1.3 $Na_2O:Al_2O_3$:2.1 to 8.0 $SiO_2$ and having a cancrinite-like structure in which the twelvering channel thereof is substantially unblocked. The zeolite herein has an x-ray diffraction pattern which identifies it as having a cancrinite-like structure, the pattern being disclosed in *Zeit. Krist.*, 122, 407 (1965), supra, the disclosure of which is incorporated herein by reference. This material may be considered as having a cancrinite-type structure but with higher Si/Al ratios than known before.

The novel zeolite of this invention is prepared by a process comprising:

(a) preparing a reaction mixture comprising aqueous ammonia, a source of silica, a source of alumina and sodium hydroxide, said reaction mixture having a composition, in terms of mole ratios of oxides, within the following ranges:

$Na_2O:Al_2O_3$:2 to 17
$SiO_2:Al_2O_3$:2 to 20
$H_2O:Al_2O_3$:60 to 450 wherein the aqueous ammonia is present in the reaction mixture in an amount of 15 to 30 percent, based on total moles of $H_2O$.

(b) maintaining the reaction mixture at a temperature and for a time sufficient to cause crystallization of the zeolite.

The ECR-5 zeolite may be used as a sorbent or as a catalyst, e.g., as a hydrocarbon conversion catalyst for, e.g., paraffin isomerization, aromatization, reforming polymerization and alkylation or the cracking, hydrocracking and hydrodewaxing of lube stocks, fuels and crude oils.

It will be understood that the compositions herein as prepared may contain some waters of hydration which may be at least partially removed when the zeolites are employed as sorbents or catalysts. In addition, the sodium cation in the original synthesized zeolite may be subsequently exchanged with hydrogen, ammonium cations, metal cations from Groups I through VIII of the Periodic Table, or mixtures thereof, to provide a suitable catalyst material.

BRIEF DESCRIPTION OF THE DRAWING

The FIGURE is a comparison of the $^{29}Si$-MASNMR for two ECR-5 materials and a cancrinite material.

DESCRIPTION OF THE PREFERRED EMBODIMENTS

The novel ECR-5 zeolites of this invention have a cancrinite-like framework as determined by x-ray diffraction analysis and comparison with the x-ray diffraction pattern characteristic of cancrinites. See, *Zeit. Krist.* supra. As will be discussed below, the x-ray diffraction pattern for a typical ECR-5 material is compared with the theoretical pattern and that for material cancrinite in Table 1 below.

One distinguishing feature of ECR-5 is its multipeak $^{29}$Silicon magic angle spinning nuclear magnetic resonance spectra ($^{29}Si$-MASNMR). The use of $^{29}Si$-MASNMR to measure independently the framework Si/Al ratio has been extensively demonstrated. See, Melchior et al, Am. Chem. Soc., 104, (1982), p. 4859 et seq; Klinowski et al, *J. Chem. Soc. Faraday I*, 78, (1982) p. 1025 et seq. Synthetic and mineral samples of cancrinite may be distingusihed by a single peak at about −87 ppm (relative to 4,4 dimethyl-4 silopentane sulfonate (DSS). This peak is characteristic of a material having an Si/Al ratio, in the framework of unity. See the cancrinite spectrum in the FIGURE. This method of measuring framework silicon and aluminum content is especially accurate in that it effectively ignores dissolved and detrital silicon and aluminum. The two ECR-5 $^{29}Si$-MASNMR spectra shown in FIG. 1 are multipeak. Those peaks are characteristic of lattice silicon atoms having three next neighbors (Si(3Al)), two next neighbors (Si(2Al)) and one next neighbor (Si(1Al)) in addition to the peak which is characteristic of Si(4Al). The Si(4Al) peak is, of course, that shown in the cancrinite spectrum in FIG. 1. The multiple peaks in the ECR-5 $^{29}$Si-MASNMR is clear evidence that ECR-5 has a framework Si/Al ratio greater than unity, as it contains peaks characteristic of Si surrounded by less than 4 Al atoms and therefore has an Si/Al ratio greater than unity.

Another distinguishing feature of ECR-5 as compared to prior art cancrinite materials is its capacity to absorb reversibly hydrocarbon molecules. This ability is the result of the substantially unblocked 12-ring channel contained within its structure. The sorption capacity of the zeolite, characterized herein as a 12-ring channel which is "not substantially blocked", can be measured by thermogravimetric analysis (TGA) wherein the hydrated sample is first heated to a selected elevated temperature such as 400° C., and subjected to a low partial pressure of a hydrocarbon such as butane or hexane. Sorption of greater than about 1% by weight of hydrocarbon is indicative of an accessible structure, in this case an accessible 12-ring channel. ECR-5 is capable of adsorbing 1% to 6% by weight hexane. Such sorption is not found in conventional cancrinite. As was discussed above, the salts, and faults usually found in such channels cannot be removed by methods known to this inventor.

The zeolites herein have a composition, in terms of mole ratios of oxides, in the range:

1.0 to 1.3 $Na_2O:Al_2O_3$:2.1 to 8.0 $SiO_2$.

A particularly preferred zeolite herein for use as a catalyst or sorbent has a composition in the range:

1.0 to 1.3 $Na_2O:Al_2O_3$:2.4 to 6.0 $SiO_2$.

The most preferred ECR-5 has a composition in the range:

1.1 to 1.3 $Na_2O:Al_2O_3$:2.4 to 3.1 $SiO_2$

Minor variations in the mole ratios of the oxides within the ranges given in the above chemical composition for ECR 5 do not substantially alter the structure of properties of the zeolite.

Scanning electron microscopy shows these products to be generally small prismatic crystals at lengths in the range of 0.1 to 0.5μ and having aspect ratios in the range of 2 to 6. The x-ray diffraction peaks are often broadened because of the small crystal size.

Although incidental to the ECR-5 zeolite disclosed and claimed herein the process discussed, infra, is capable of producing the cancrinite zeolite without the occluding salts. As noted above, cancrinite crinite without the including salts are not found in the prior art. The occluded cancrinite has either no or minimal adsorption capabilities for hydrocarbon.

The sodium cations of ECR-5 may be subsequently exchanged if desired, for other cations using, for example, conventional ion exchange techniques as discussed, e.g., in U.S. Pat. No. 3,216,789. This exchange may be particularly important for certain subsequent catalytic or sorptive uses. The cations which may be thus exchanged with the sodium cations of the zeolite may be hydrogen or ammonium cations or cations of metals from any one of Groups I to VIII of the Periodic Table or mixtures thereof. Preferably, the cations will be mono-, di- and trivalent metal cations, particularly from Groups I, II or III of the Periodic Table, such as barium, calcium, cerium, lithium, magnesium, potassium, sodium, strontium, zinc, and the like, or hydrogen, ammonium or alkylammonium cations. These exchangeable cations will generally not cause a substantial alteration of the basic crystal structure of the zeolite. Particularly preferred are mono- and divalent cations, as they are more easily included in the pores of the zeolite crystal. However, maximum sorptive capacity is usually obtained by replacing the exchangeable channel cations with protons. One acceptable method of making such a replacement is ammonium exchange followed by heating or by a mild acid treatment with a pH above about 4.

In a preferred method for preparing the ECR-5 zeolite composition, a reaction mixture is prepared, generally as a slurry, containing sodium hydroxide, aqueous ammonia, a source of alumina, and a source of reactive silica such as, e.g., silica gels, silicic acid, and aqueous colloidal silica sols as described, e.g., in U.S. Pat. No. 2,574,902, and potassium or sodium silicates. Zeolite products of highest purity are preferably prepared using potassium silicate. The alumina may be derived from kaolin or halloysite but is preferably derived from metakaolin, which has a theoretical oxide formula of $Al_2O_3$:$2SiO_2$. Metakaolin is preferred in that it eliminates gellation problems that frequently promote impurity formation. The metakaolin may be obtained, for example, by heating kaolin or halloysite clay, having an oxide formula of $Al_2O_3$:$2SiO_2$.$xH_2O$ (x=1 or 2, respectively) at over 600° C. for about two or more hours to remove the waters of hydration therefrom and to render the structure amorphous and reactive.

Alternatively, the silica and alumina sources may be together provided by a preformed silica-alumina gel having a Si/Al ratio of from 1.2 to 4.0, preferably from 2.0 to 3.0. This gel may be commercially obtained or it may be prepared by a variety of synthesis procedures well-known in the art such that $Al^{3+}$ is in the predominant tetrahedral form. In one technique, the preformed gel is prepared by mixing together sodium silicate, aluminum sulfate, water and sodium hydroxide to form a reaction mixture. This mixture is then adjusted to a pH of between 5.0 and 9.0, preferably 7.0 and 8.0, using a suitable acid such as, e.g., sulfuric acid or hydrochloric acid. The mixture thus treated is then aged at about 15° to 70° C., preferably about room temperature to 30° C., for at least 10 minutes, preferably 30 to 60 minutes. After this period, the mixture is filtered, and then preferably washed with water or a salt solution such as ammonium sulfate, and then dried to remove excess water. Preferably, the gel is dried to a degree of dryness of about 10 to 30% by weight based on the total product weight. Typical preparations of such gel materials are described in Magee and Blazek, *ACS Monograph* 171, Ch. 11, Ed. J. A. Rabo.

The aqueous ammonia which must be present in the reaction mixture may be added as an aqueous ammonia solution containing, e.g., up to about 30% by weight of ammonia. Alternatively, liquid or gaseous ammonia may be added directly to the synthesis reactor.

The amounts of ingredients in the reaction mixture will vary considerably depending, e.g., on the types of ingredients employed (e.g., the sources of silica and alumina) and the particular composition ultimately desired. In general, however, the relative amounts of ingredients will be such that the reaction mixture will have a composition, in terms of mole ratios of oxides, within the following ranges:

| Oxide Constituents | Ranges of Mole Ratios |
|---|---|
| $Na_2O:Al_2O_3$ | 2 to 17 |
| $SiO_2:Al_2O_3$ | 2 to 25 |
| $H_2O:Al_2O_3$ | 30 to 450 |
| $(H_2O + NH_3):Al_2O_3$ | 50 to 600 |

Preferably, the mole ratio of $Na_2O$ to $Al_2O_3$ in the reaction mixture ranges from about 2.5 to 12, the mole ratio of $H_2O$ to $Al_2O_3$ ranges from 60 to 300 and the mole ratio of $SiO_2$ to $Al_2O_3$ ranges from 2.1 to 12, more preferably, 2.1 to 7. The aqueous ammonia is present in the reaction mixture generally in an amount of about 15 to 50 mole percent, based on total moles of $H_2O$, and preferably is present in an amount of 20 to 30 mole percent. The ECR-5 product may be formed in reaction mixtures containing more than 30 mole percent ammonia. However, such high ammonia controls typically mandate pressurization of the reactor.

The order of mixture of ingredients is not essential, and all ingredients may be added simultaneously. The reaction mixture is ordinarily prepared in a container made of metal or glass or the like which should be closed to prevent water loss, or equipped so as to maintain constant water levels and minimize loss of ammonia.

After the reaction mixture is formed it is placed in a reactor which can withstand elevated pressures such as an autoclave, where it is maintained at a temperature and for a time sufficient to cause crystallization of the zeolite. Preferably, the temperature will range from between about 50° and 150° C., more preferably 75° and 90° C. for commercial purposes, to induce crystallization. The exact temperature will depend, for example, on the amount of sodium hydroxide present and the length of time employed for reaction. (At temperatures much above about 100° C. the zeolites obtained are not commercially acceptable due to the rapid crystallization of impurity phases which may occur, resulting in a poor quality product.)

During crystallization the reaction mixture should be maintained in a substantially homogeneous state. For example, metakaolin tends to settle out of the reaction mixture if there is insufficient stirring. If the reaction mixture is not substantially homogeneous, the crystallized product ultimately obtained will comprise a mixture of zeolite products and will thus be impure. Homogeneity may be achieved by blending the reaction mixture until the desired degree of homogeneity is obtained. The mixing may take place in any vessel in which complete mixing can be effected such as in a blender or a reaction vessel equipped with an agitator.

Alternatively, the reaction mixture after its formation can be subjected immediately to the elevated reaction temperatures above prescribed, with slow stirring thereof to ensure substantial homogeneity. If such stirring is employed, however, it is preferably carried out at a rate of less than about 200 RPM because faster stirring speeds promote formation of impurities such as phillipsite, presumably due to a medium known as "collision nucleation".

During heating of the substantially homogeneous reaction mixture, autogenous pressures are maintained which will depend on the temperature employed. The amount of time required for heating will depend mainly on the temperature employed, so that at 60° C. the heating may be carried out, e.g., for up to 6 to 8 days, whereas at 90° C. the time period may be, e.g., 2 to 3 days. In any event, the heating is carried out until maximum amounts of ECR-5 product crystals are formed.

The crystallization time may be shortened by seeding the reaction slurry with minor amounts of a source of nuclei (e.g., zeolite ECR 5 crystals of this invention). Preferably, before heating a cancrinite or ECR-5 zeolite is added to the mixture in an amount of from 0.1 to 10% by weight based on silica and alumina. Nucleation may also be induced by aging the slurry or a portion of the slurry at about 10° to 50° C. for about 6 hours to 6 days prior to the crystallization at 70° to 100° C. The preferred mode of seeding is to add small amounts of ECR-5 during formation of the precursor $SiO_2$-$Al_2O_3$ gel.

When the zeolite crystals have been obtained in sufficient amount they are recovered by filtration from the reaction mixture and are then washed, preferably with deionized or distilled water, to wash away excess mother liquor. The washing is preferably continued, for best purity results, until the wash water, equilibrated with the product, has a pH of between about 9 and 12. After the washing step the zeolite crystals may be dried or calcined.

The zeolite ECR 5 of this invention may be used as a sorbent or as a catalyst, e.g., in a hydrocarbon conversion process such as in paraffin isomerization, dewaxing, aromatization, and alkylation and in the cracking or hydrocracking of lube stocks, fuels and crude oils. To be employed for these applications, the zeolite may be at least partially dehydrated by drying at temperatures of up to about 500° C. or more until most or all of the water of hydration is removed, and may be ion-exchanged as described above.

The examples which follow illustrate the invention. In all examples, parts and percentages are given by weight and temperatures in degrees Centigrade unless otherwise noted.

EXAMPLE 1

A commercially obtained dried silica-alumina cracking catalyst gel (high alumina, Davison Chemical Co.) having a Si/Al ratio of 2.5 and containing about 10% $H_2O$ was mixed together in an amount of 6.7 g with 4.78 g NaOH and 28.3 g aqueous ammonia containing 29% ammonia in a 75 ml stainless steel autoclave. The input stoichiometry was:

$$4\ Na_2O:Al_2O_3:5.1\ SiO_2:76\ H_2O:33\ NH_3.$$

This mixture was then placed in an oven at 90° C. in which it was slowly rotated. After five days the autoclave was removed and the sample filtered, washed and dried. X-ray diffraction analysis revealed that the composition was pure ECR-5 with a cancrinite-like structure. Chemical analysis yielded an element atom weight composition of:

17.5%Si, 13.7%Al, 13.7%Na, representing a stoichiometry, in terms of mole ratios of oxides, of:

$$1.18\ Na_2O:Al_2O_3:2.46SiO_2$$

Thermogravimetric analysis of this sample to a temperature of 500° C. showed a weight loss of 13.5% by weight. Sorption of n-butane at 0° C. and −25° C. at 100 torr gave values of 2.1 wt. % and 4.2 wt. % respectively, reflecting an open-channel zeolite.

EXAMPLE 2

A synthetic silica-alumina gel having a Si/Al atomic ratio of 3.11 was prepared by gelling sodium silicate with an aluminum sulfate solution. Thus, 322 g of sodium silicate ('N' Brand from Philadelphia Quartz Co. with a ratio of $SiO_2:Na_2O$ of 3.22) was diluted with 833 g of $H_2O$ in a mixer, and 89.4 g of a 50% NaOH solution was added. A 12% solution of aluminum sulfate (consisting of 399 g of $Al_2(SO_4)_3.18H_2O$ and 1356 g of $H_2O$) was then slowly added with vigorous stirring. A 2N solution of $H_2SO_4$ was then used to adjust the pH to 8. After aging for 45 minutes at 25° C. the gel was filtered, washed with a 10% $(NH_4)_2SO_4$ solution and dried at 350° C. A total of 6.7 g of this gel was mixed in an autoclave with 4.78 g of NaOH and 28.3 g of aqueous ammonia solution containing 29% ammonia. The input stoichiometry of this reaction mixture was:

$$4.7\ Na_2O:Al_2O_3:6.2\ SiO_2:38\ NH_3:88\ H_2O$$

The mixture was placed in an oven at 90° C. and reacted for five days, after which time the ammonia was vented from the sample and the sample was filtered, washed and dried. X-ray diffraction analysis revealed the product to be pure ECR-5, and chemical analysis revealed an atom weight composition of 12.1% Al, 15.8% Si and 12.3% Na. This represents a zeolite stoichiometry of:

$$1.19\ Na_2O:Al_2O_3:2.50\ SiO_2$$

EXAMPLE 3

A synthetic silica-alumina gel having an Si/Al ratio of 3.8 was prepared by the procedure described in Example 2, except that the components were:

423.6 g: sodium silicate ('N' brand)
328 g: $Al_2(SO_4)_3.18H_2O$
37 g: 50% NaOH
2211 g: $H_2O$ A total of 6.7 g of this dried gel was mixed in an autoclave with 4.78 g of NaOH and 28.3 g of aqueous ammonia solution containing 29% ammonia. The input stoichiometry was about:

$$5.6\ Na_2O:Al_2O_3:7.6\ SiO_2:44.7\ NH_3:103\ H_2O$$

This mixture was reacted at 90° C. for 5 days, the ammonia was vented, and the product was filtered, washed and dried. On analysis by x-ray diffraction and plasma emission spectrometry, the zeolite was found to be pure ECR-5 with a cancrinite structure having an atom weight composition of 12.9% Al, 18.3% Si and 13.8% Na, representing a stoichiometry of:

$$1.26\ Na_2O:Al_2O_3:2.72\ SiO_2$$

The high silica nature of this material is confirmed by the $^{29}$Si-MASNMR spectrum shown in the FIGURE. Scanning electron microscopy showed uniform 0.1 crystals. X-ray diffraction analysis confirmed these by showing appreciable peak broadening. The X-ray diffraction pattern for this material is shown in Table 1 below and is compared to that for natural cancrinite and to the theoretical pattern.

EXAMPLE 4

(Comparative Example)

A conventional sample of cancrinite was prepared in the presence of $NaNO_3$, where $NaNO_3$ remained in the structure of the sample as an occluded salt, as follows:

A slurry of the following composition, in terms of mole ratios of oxides:

$Na_2O:Al_2O_3:2.5$
$SiO_2:Al_2O_3:2$
$NaNO_3:Al_2O_3:0.44$
$H_2O:Al_2O_3:110$ was prepared by mixing together 25.6 g of NaOH, 25.74 g of $Al_2O_3.3H_2O$, 69.1 g of sodium silicate ('N' brand), 179.6 g of $H_2O$, and 7.3 g of $NaNO_3$. After heating this solution for 3 days at 220° C. in an autoclave, the product was cooled, filtered, washed and dried at 110° C. The product was then hydrated at 35% relative humidity. X-ray diffraction analysis showed the sample to be pure cancrinite, and chemical analysis yielded a $SiO_2$ to $Al_2O_3$ ratio of two. TGA analysis of the zeolite gave 4 wt. % loss at 500° C. and 8.6 wt. % loss at 700° C. where the sample was destroyed.

EXAMPLE 5

In this example, the inventive process was used in an attempt to produce a cancrinite zeolite having open channels and no occluded salts in the channels.

The procedure of Example 1 was employed to prepare a zeolite, except that 6.7 g of metakaolin was employed rather than 6.7 g of the silica-alumina gel. The input stoichiometry was:

$$2.15\ Na_2O:Al_2O_3:2\ SiO_2:17.4\ NH_3:40\ H_2O.$$

The product was shown to constitute pure cancrinite having a $SiO_2:Al_2O_3$ ratio of two.

The cancrinite produced in Example 5, made in the presence of ammonia, has an unblocked twelve-ring channel and shows excellent reversible sorption at 500° C. TGA analysis produced 12.6 wt. % weight loss at 500° C. and 1 wt. % at 800° C. It does not decompose as quickly as the conventional cancrinite shown in Example 4, which had its twelve-ring channel blocked by salt molecules.

EXAMPLE 6

A silica alumina gel precursor was prepared by using an 8% $SiO_2$ solution (423.6 gm N brand sodium silicate (PG Corp.) in 1114 gm $H_2O$ with 18.5 gm NaOH added) with a 12 wt. % alumina solution comprising 328 gm aluminum alum (17 $H_2O$) in 1115 gm $H_2O$. Mixing was done using a Hobart mixer, with slow addition of alum to the silicate to a pH of 8. The gel was allowed to age for 1 hour at room temperature, before filtering on a 32 cm Buchner funnel. After washing with 6 liters of 10% $(NH_4)_2SO_4$, the product was dried overnight at 125° C., then calcined for 3 hours at 350° C. The final product gave a chemical analysis of 22 wt. Si and 4.57 Al (Si/Al=4.7).

44.7 gm of this gel were then reacted in an autoclave with 31.9 gm NaOH dissolved in 189 gm aqueous ammonia solution (29% $NH_3$) for 4 days at 90° C. The input stoichiometry was:

$$13.2\ Na_2O:Al_2O_3:20.5\ SiO_2:112\ NH_3:260\ H_2O$$

The final product was seen to be excellent ECR-5 with a cancrinite-like structure by X-ray diffraction analysis. The analysis is shown in Table I, infra. It had a chemical analysis by plasma spectrometry of 12.81% Na, 12.60% Al, 19.84% Si, corresponding to a stoichiometry of: 1.19 $Na_2O:Al_2O_3:3.02\ SiO_2$.

This sample was then exchanged twice with 250 gms 10% wt KCl solution at 60° C., 2.5 gm of this sample were analyzed at 60° C. for 1 hr. with a 20 wt. % solution of ammonium chloride, filtered, washed and dried. After activating at 400° C. overnight, n-hexane isotherms were measured. The sample sorbed 5.2 wt. % and 2.2 wt. %, respectively at 0° C. and 27° C. and 20 torr. The $^{29}Si$-MASNMR spectrum of the exchanged ECR-5 is given in the FIGURE. It clearly has a high silica to alumina ratio when compared to that of cancrinite.

TABLE 1

Typical X-ray Diffraction Patterns for Cancrinite and ECR-5

| | Theoretical Pattern P 63 a = 12.75 c = 5.14 | | Natural Cancrinite ASTM = 20.257 a = 12.60 c = 5.13 | | Typical ECR-5 | | | |
|---|---|---|---|---|---|---|---|---|
| | | | | | Ex. 3 a = 12.64 c = 5.13 | | Ex. 6 a = 12.64 c = 5.18 | |
| h K l | dÅ | | dÅ | I/I$_o$ | dÅ | I/I$_o$ | dÅ | I/I$_o$ |
| 100 | 11.04 | | 11.00 | 30 | — | | — | |
| 110 | 6.38 | | 6.32 | 60 | 6.33 | 83 | 6.33 | 76 |
| 200 | 5.52 | | 5.47 | 10 | — | | 5.47 | 14 |
| 101 | 4.66 | | 4.64 | 80 | 4.65 | 94 | 4.64 | 90 |
| 210 | 4.17 | | 4.13 | 30 | 4.14 | 22 | 4.13 | 23 |
| 111 | 4.00 | | — | | — | | | |
| 201 | 3.762 | | 3.75 | 10 | — | | | |
| 300 | 3.681 | | 3.65 | 50 | 3.65 | 100 | 3.65 | 97 |
| 211 | 3.240 | | 3.22 | 100 | 3.22 | 49 | 3.23 | 100 |
| 220 | 3.188 | | — | | — | | — | |
| 310 | 3.063 | | 3.03 | 30 | — | | 3.04 | 6 |
| 301 | 2.993 | | 2.974 | 30 | — | | | |
| 400 | 2.761 | | 2.732 | 60 | 2.736 | 44 | 3.734 | 38 |
| 221 | 2.709 | | — | | — | | — | |
| 311 | 2.631 | | 2.610 | 50 | 2.612 | 28 | 3.595 | 37 |
| 002 | 2.570 | | 2.564 | 60 | — | | — | |
| 320 | 2.533 | | 2.500 | 30 | — | | — | |
| 102 | 2.503 | | — | | — | | — | |
| 401 | 2.432 | | — | | — | | — | |
| 410 | 2.410 | | 2.410 | 50 | 2.424 | 23 | 2.418 | 20 |
| 112 | 2.384 | | — | | — | | 2.392 | 9 |

In summary, the present invention is seen to provide a novel crystalline zeolite, ECR 5, which has a cancrinite-like structure and is characterized as having a twelve-ring channel not substantially blocked by imbibed salt and is capable of adsorbing hydrocarbon molecules.

What is claimed is:

1. A crystalline zeolite, being isostructural to cancrinite, in which the twelve-ring channel has a sorption of greater than about 1% by weight hexane, said crystalline zeolite having a composition, in terms of mole ratios of oxides in the range:

1.0 to 1.3 $Na_2O:Al_2O_3:2.1$ to 8.0 $SiO_2$.

2. The zeolite of claim 1 having a composition, in terms of mole ratios of oxides, in the range:

1.0 to 1.3 $Na_2O:Al_2O_3:2.4$ to 6.0 $SiO_2$.

3. The zeolite of claim 1 having a composition, in terms of mole ratios of oxides, in the range:

1.1 to 1.3 $Na_2O:Al_2O_3:2.4$ to 3.1 $SiO_2$.

4. A process for preparing a crystalline zeolite having a composition, in terms of mole ratios of oxides, in the range:

1.0 to 1.3 $Na_2O:Al_2O_3:2.1$ to 8.0 $SiO_2$ and being isostructural to cancrinite, in which the twelve-ring channel thereof has a sorption of greater than about 1% by weight hexane, comprising the steps of:

(a) preparing a reaction mixture comprising aqueous ammonia, a source of silica-alumina, and sodium hydroxide, said reaction mixture having a composition, in terms of mole ratios of oxides, within the following ranges:
$Na_2O:Al_2O_3$:2 to 17
$SiO_2:Al_2O_3$:2 to 25
$H_2O:Al_2O_3$:30 to 450
$(H_2O+NH_3):Al_2O_3$:50 to 600
wherein the ammonia is present in the reaction mixture in an amount of 15 to 30 percent, based on total moles of $H_2O$; and (b) maintaining the reaction mixture at a temperature between about 70° and 180° C. and for a time of about 1 to 10 days.

5. The process of claim 4 wherein the source of silica is a natural or synthetic amorphous aluminosilicate gel or glass.

6. The process of claim 4 wherein the sources of silica and alumina are a preformed silica-alumina gel having a Si/Al ratio of from 2.2 to 5.0.

7. The process of claim 6 wherein the preformed silica-alumina gel has a Si/Al ratio of from 1 to 20.

8. The process of claim 6 wherein the preformed silica-alumina gel is prepared from a reaction mixture comprising sodium silicate, aluminum sulfate, sulfuric acid, water and sodium hydroxide, which has been adjusted to a pH of from 5 to 10, and aged at about 15° to 50° C. for at least about 5 minutes.

9. The process of claim 4 wherein after step (a) but before step (b) the reaction mixture is blended sufficiently to form a substantially homogeneous mixture.

10. The process of claim 4 wherein microcrystalline ECR-5 seeds are added to the reaction mixture prior to step (b).

11. The process of claim 4 wherein the aqueous ammonia contains at least about 15% by weight ammonia.

12. A process for preparing a crystalline zeolite having a composition, in terms of mole ratios of oxides, in the range:

1.0 to 1.3 $Na_2O_3:Al_2O_3:2.2$ to 6.0 $SiO_2$ and being isostructural with cancrinite, in which the twelve-ring channel thereof has a sorption greater than about 1% by weight hexane, which process comprises:

(a) preparing a reaction mixture comprising aqueous ammonia, a preformed alumina-silica gel having a Al/Si ratio of 1 to 10, and sodium hydroxide, said reaction mixture having a composition, in terms of mole ratios of oxides, within the following ranges:
$Na_2O:Al_2O_3$:2.0 to 17
$SiO_2:Al_2O_3$:2 to 25
$H_2O:Al_2O_3$:30 to 450
$(H_2O+NH_3):Al_2O_3$:50 to 600 wherein the aqueous ammonia is present in the reaction mixture in an amount of about 15 to 30 percent, based on total moles of $H_2O$;

(b) blending the reaction mixture sufficiently to form a substantially homogeneous mixture; and (c) maintaining the reaction mixture at a temperature of 70° to 180° C. for 1 to 10 days until crystals of the zeolite are formed.

13. A process for preparing a crystalline cancrinite zeolite in which the twelve-ring channel thereof has a sorption greater than about 1% by weight hexane, which process comprises the steps of:

(a) preparing a reaction mixture comprising aqueous ammonia, a source of silica, metakaolin, sodium hydroxide, said reaction mixture having a composition, in terms of mole ratio of oxides, within the following ranges:

$Na_2O:Al_2O_3$:2 to 17
$SiO_2:Al_2O_3$:2 to 25
$H_2O:Al_2O_3$:30 to 450
$(H_2O+NH_3):Al_2O_3$:50 to 600 wherein the ammonia is present in the reaction mixture in an amount of 15 to 30 percent, based on total moles of $H_2O$; and (b) maintaining the reaction mixture at a temperature between about 70° and 180° C. for 1 to 10 days until crystals of the zeolite are formed.

* * * * *